United States Patent [19]

Munch

[11] Patent Number: 5,056,970
[45] Date of Patent: Oct. 15, 1991

[54] FIBERGLASS PLANER

[76] Inventor: Mattias Munch, 1225 E. Gemini Dr., Annapolis, Md. 21403

[21] Appl. No.: 466,772

[22] Filed: Jan. 18, 1990

[51] Int. Cl.$^5$ .............................................. B23C 1/20
[52] U.S. Cl. .............................. 409/136; 144/208 R; 409/175
[58] Field of Search ............... 409/293, 175, 178, 180, 409/181, 182, 135, 139, 136; 144/136 C, 134 D, 208 R, 1 E; 407/42; 30/169, 170, 475, 476

[56] References Cited

U.S. PATENT DOCUMENTS

| | | | |
|---|---|---|---|
| 2,066,741 | 1/1937 | Ripsch | 409/175 X |
| 2,264,278 | 12/1941 | Danforth | 909/178 |
| 2,393,463 | 1/1946 | Gottlieb | 409/181 |
| 2,2625,860 | 1/1953 | Plester | 409/181 |
| 2,688,348 | 9/1954 | Sullivan | 144/136 C |
| 2,987,970 | 6/1961 | Watson | 409/181 |
| 3,044,366 | 7/1962 | Bidart | 409/181 |
| 3,501,999 | 3/1970 | Parks | 409/178 X |
| 4,485,858 | 12/1984 | Cecchi | 407/42 |
| 4,948,307 | 8/1990 | Dodos | 409/136 |

FOREIGN PATENT DOCUMENTS

| | | | |
|---|---|---|---|
| 2743313 | 4/1979 | Fed. Rep. of Germany | 409/175 |
| 727229 | 3/1932 | France | 144/134 D |
| 1240860 | 8/1960 | France | 144/208 R |
| 8500375 | 9/1986 | Netherlands | 409/139 |
| 1146139 | 3/1985 | U.S.S.R. | 409/139 |

Primary Examiner—William Briggs
Attorney, Agent, or Firm—John K. Donaghy

[57] ABSTRACT

The described invention is intended for use primarily in the yacht repair industry and specifically in the repair of fiberglass hulls of yachts. However, its use will not be limited to fiberglass in yachts but fiberglass in general where applicable.

The invention removes gelcoat (coating over fiberglass) and/or consecutive layers of fiberglass laminate.

The invention is specifically designed to remove osmotically blistered gelcoat and/or fiberglass laminate in an efficient and in an environmentally attractive fashion.

The invention "planes" off gelcoat and/or fiberglass laminate duplicating the existing contour of the hull or boat bottom. The cutterhead is continually flushed with water to prevent toxic dust from being released into the air. Interchangeable depth gauges allow change in the depth of the cut. Gelcoat and fiberglass are removed anywhere from a 0 to ¼ inch depth at a rate of four square feet per five minutes leaving a consistent and fair surface.

4 Claims, 4 Drawing Sheets

FIBERGLASS PLANER

BACKGROUND

The practicality for this invention is based on the following facts. Conventional methods for removing gelcoat and/or fiberglass laminate off of boat bottoms or hulls (i.e. electrical sanders and sandblasting) are extremely time consuming, do not leave a duplicate flush surface on the hull or bottom of a boat, and are environmentally hazardous.

Because the teeth on the cutterhead are flushed and cooled continuously with water, acting as chip breakers, a non electrical power unit was developed because of the risk of electric shock.

Conventional type solid blade planers can not follow the contour of the hull of a boat. The blades heat up very quickly and the solid blades have trouble breaking the surface of gelcoat and fiberglass (staggered tooth planer cutterhead breaks surface much more easily).

Somewhat similar apparatuses to the staggered tooth planer cutterhead and rollerguides used in the Hand Held Planer Unit of this invention exist in the wood working/furniture making industry (i.e. router bits, thickness planers, hand held planers and flush trim router bits).

SUMMARY OF THE INVENTION

The invention consists of two principal members; a moveable bottom power unit (BPU) providing horsepower via hydraulic hoses to the other principal unit; the hand held planer unit (HHPU).

The BPU consists of an aluminum platform mounted on two pneumatic wheels. Handles attached to the back portion of the platform are used to coil up the hydraulic hoses and to push the unit around.

Mounted on the platform is a five gallon hydraulic fluid tank, an eight horsepower utility engine (Briggs and Stratton), a twelve volt battery, hydraulic fluid filter and a hydraulic fluid cooler. Bolted onto the engine is an hydraulic pump and a twelve volt selinoid valve with a relief valve and subplate.

Hydraulic lines, a water hose and electrical wire (50 ft long) lead to the HHPU.

The HHPU consists of a staggered tooth planer, cutterhead, a hydraulic motor, two pulleys of different diameter of which one is attached to the hydraulic motor and the other attached to a shaft which is inserted into the cutterhead setup. The two pulleys are connected by a rubber power transmission belt. The cutterhead and hydraulic motor are encased in aluminum sideplates onto which two handles are attached; one, horizontal, at the top of the unit; the other, vertical at the bottom of the unit.

When the HHPU is not in operation, the hydraulic pump, driven by the utility engine, pulls hydraulic fluid from the holding tank through the subplate with the twelve volt solinoid and relief valve, through the hydraulic fluid filter and back into the holding tank.

When the twelve volt solinoid valve is engaged, fluid flow is directed to the hydraulic motor in the HHPU. A return line from the hydraulic motor leads fluid through a fluid cooler (BPU), through the filter and back into the holding tank. Hydraulic fluid pressure exceeding 2500 psi is allowed to escape through the relief valve and is directed back into the holding tank.

A garden hose attachment allows water to run past the fluid cooler and into the HHPU continuously flushing the cutterhead and cut material with water.

As the cutterhead is engaged, the operator pushes the HHPU onto the surface to be cut. The left side of the cutter digs in, the right side rides on top of the surface as the rollerguides "guide" the cutterhead. The operator moves the HHPU from top to bottom along the hull of the boat. The second cut overlaps the first with the right side of the cutterhead to the left of the first cut and stops slightly before coming to the end of the first cut. All the consecutive cuts are performed in the same manner until this "stepping" of cuts forces the operator to move back to the initial cut and complete its full length and so on.

BRIEF DESCRIPTION OF THE DRAWINGS

The invention is described in greater detail hereinafter according to the detailed description and the attached drawings.

DETAILED DESCRIPTION OF THE INVENTION

Figure 1:
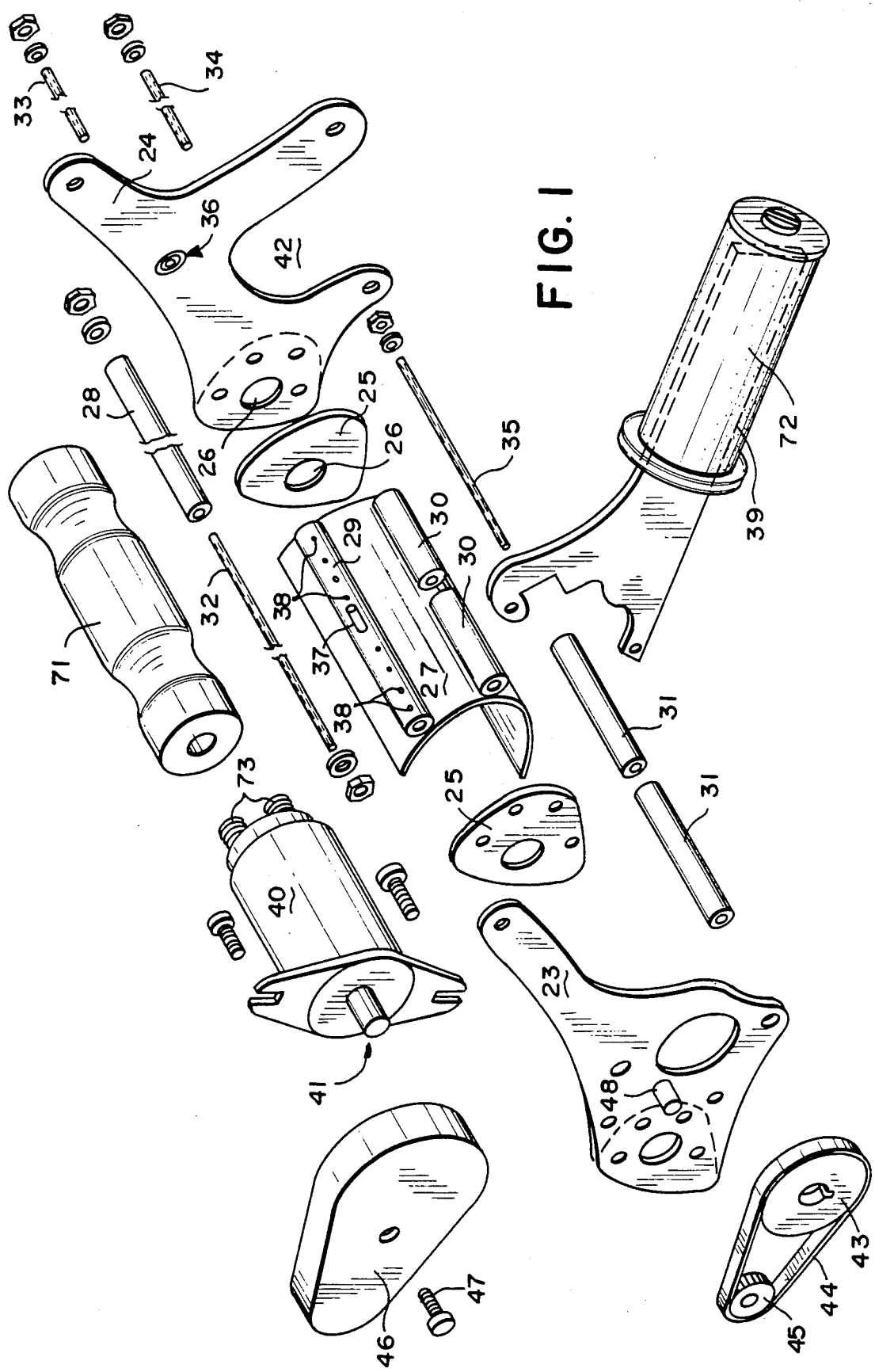
FIG. 1 is a perspective view of various elements of the Hand Held Planer Unit (HHPU).
Figure 2:
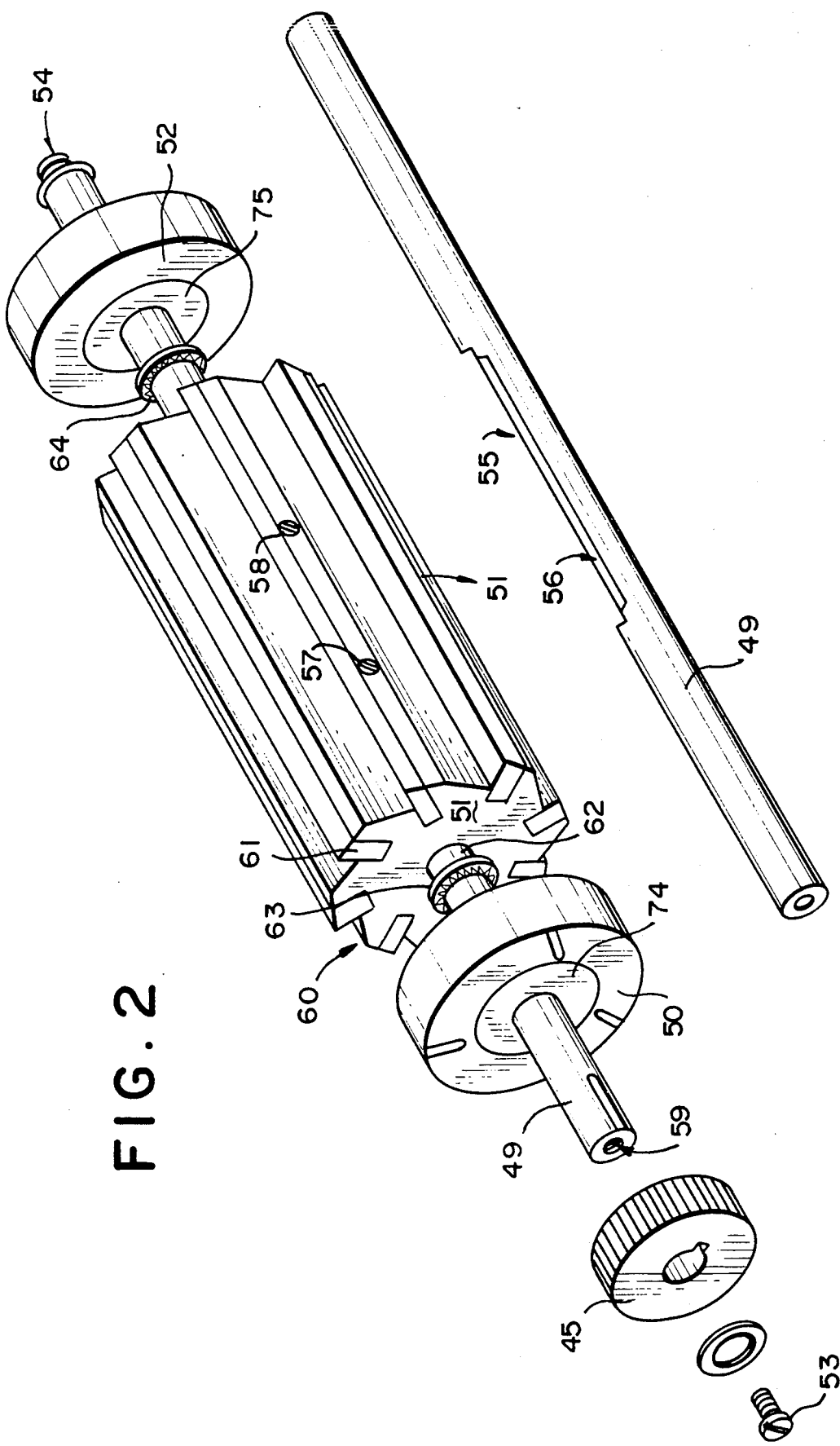
FIG. 2 is a perspective view of the cutterhead setup.
Figure 3:
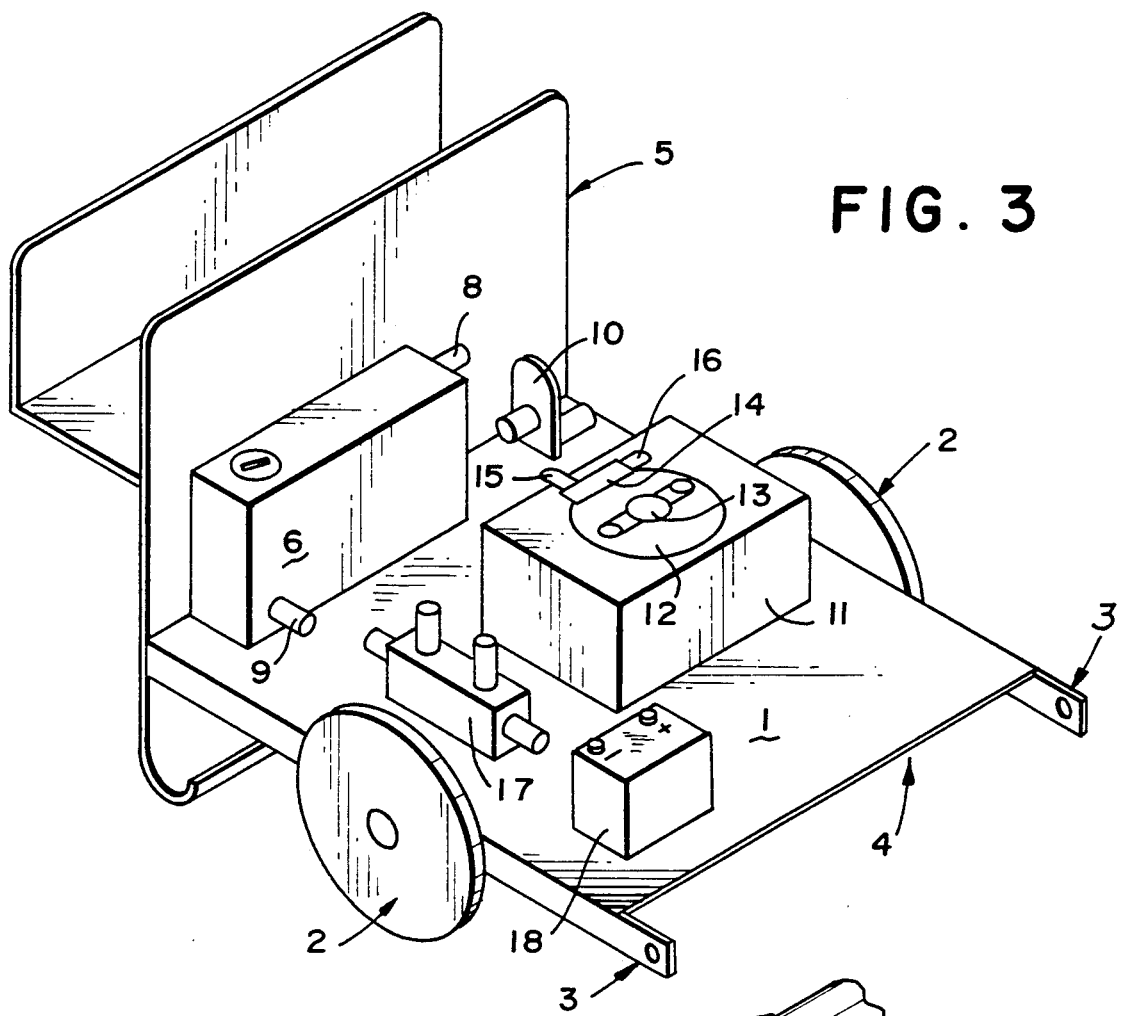
FIG. 3 is a perspective view of the Bottom Power Unit (BPU).
Figure 4:
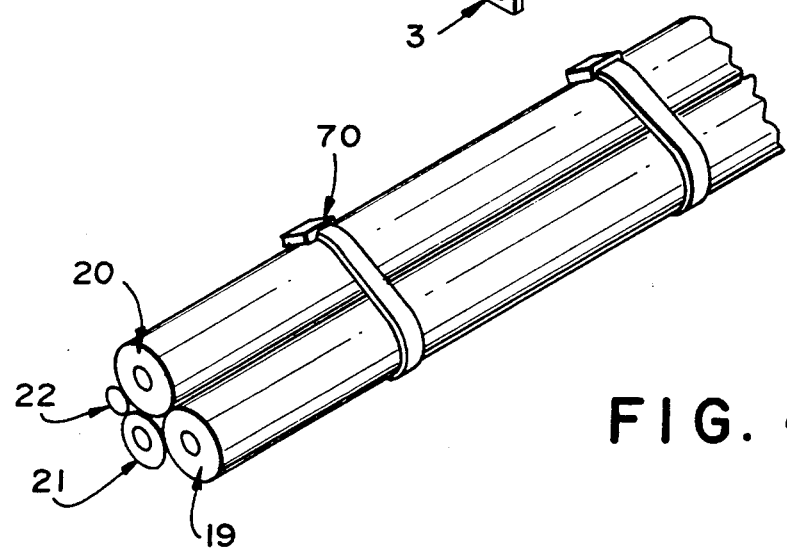
FIG. 4 is a perspective view of the hoses and electrical wire connecting the Bottom Power Unit to the Hand Held Planer Unit.
Figure 5:
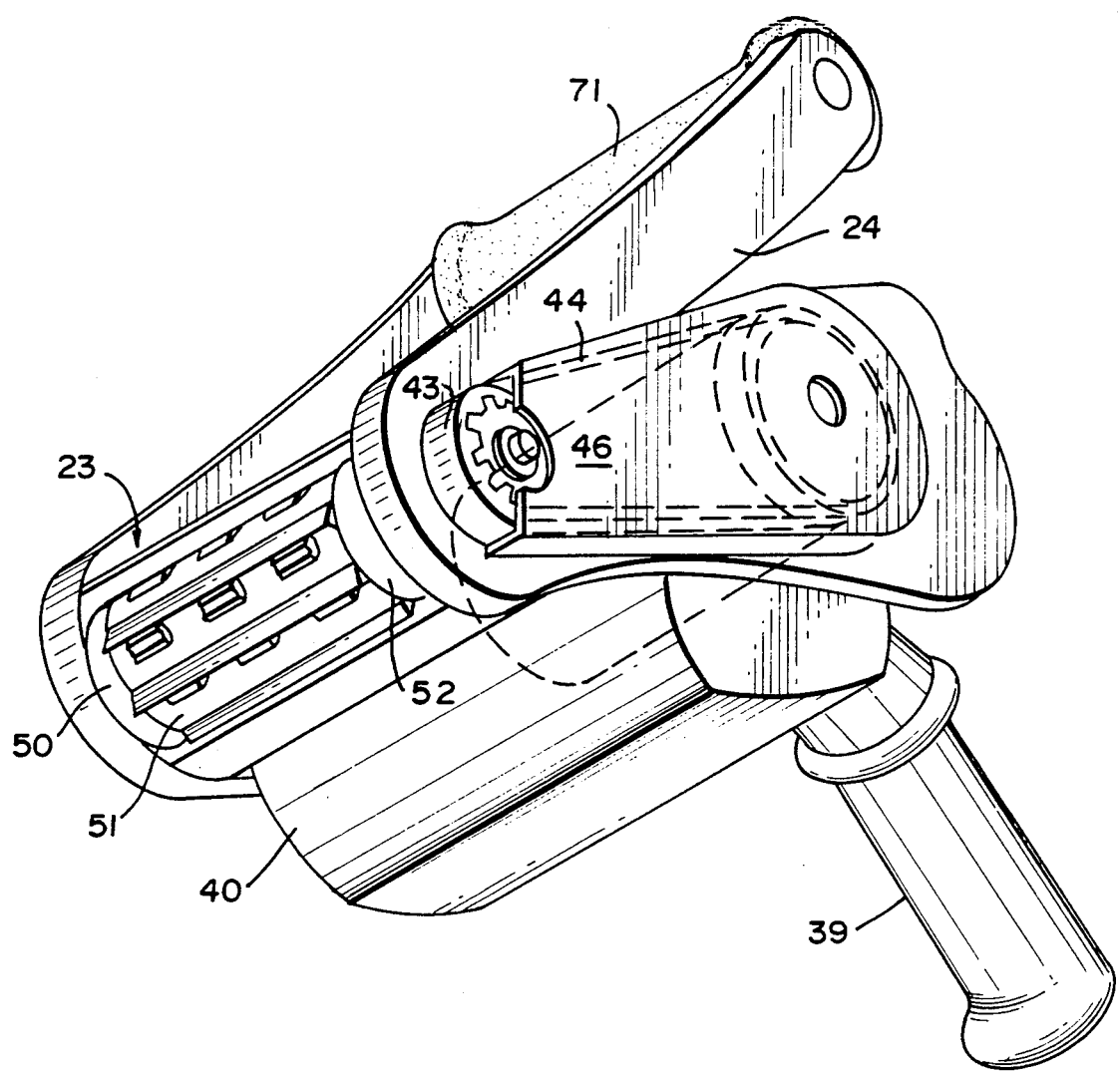
FIG. 5 is a perspective view of the assembled device.

The following is a detailed description of the positioning of the parts and materials used in the components of the invention.

The size of the aluminum mounting platform (1) of the BPU is approximately two by three feet and one quarter inch in thickness. It is mounted on two pneumatic wheels (2). Welded onto the side of the platform is (one quarter inch by two inch) aluminum bar stock (3) extending in the front by approximately three inches past the platform. It houses a one inch stainless steel pipe (4) serving as a pick-up handle. Bolted onto the back of the platform is a bent stainless steel handle bar (5) (one inch in diameter) serving as a brackett for the coiled up hydraulic hose, a handle to push the unit around, and a foot to stand on when in place.

In front of the handle bars is an aluminum hydraulic fluid holding tank (6) (approximately four inches by one and one half feet by two feet in size) with a fluid fill (7), a return line nipple (8) on the top and a feed nipple (9) on the bottom. To the left of the holding tank a hydraulic fluid filter (10) is mounted on the platform. In front of the fluid filter and holding tank, an eight horsepower utility engine (11) is bolted onto the platform. Bolted onto the engine is an adapter brackett (12) for the hydraulic pump (13) and the subplate (14) into which a relief (15) valve and a twelve volt selinoid valve (16) are inserted. Next to the adapter brackett on the right hand side of the platform, an hydraulic fluid cooler (17) is mounted. The right hand front of the platform provides room for a twelve volt battery (18). Except for the fluid feed line (one half inch inside diameter), all of the hydraulic hoses are three eighths inch inside diameter.

There are several hoses which connect the BPU to the HHPU. All of the hoses are bundled together with plastic tie-wraps (70). They are listed as follows.

1. Connecting the BPU subplate with the HHPU hydraulic motor is one high pressure (three eighths inch inside diameter, three thousand psi max) hydraulic hose fifty feet long with a nenety degree metal fitting approximately ten feet from the hydraulic motor (19).

2. Connecting the hydraulic motor exit port in the HHPU to the fluid cooler in the BPU are five feet of high pressure line connected to fourty five feet of low pressure line (all three eighths inch inside diameter) (20).

3. Connecting the hydraulic fluid cooler in the BPU to the water exhaust orifice in the HHPU is clear plastic hose fifty feet long with an inside diameter of one quarter inch (21).

4. Connecting the twelve volt selinoid valve (BPU) to the electrical switch (HHPU) is light gauge braided marine grade electrical wire fifty feet long (22).

The HHPU consists of two quarter inch thick aluminum sideplates (23,24). Each is of a different shape. Fastened into the front of the sideplates are two aluminum cheek plates (25), three eighths inch thick. Ball bearings (26) sit within these side and cheek pieces. The cheek plates also provide a ledge for an eighth inch half round aluminum cover (27) protecting the cutterhead setup (cutterhead and rollerguides. Four aluminum tubes (28,29,30,31) (three eighths inch inside diameter) approximately three and one half inches long serve as spacers between the side plates. Four stainless steel threaded rods (32,33,34,35), placed inside the aluminum tubes and through the sideplates, hold the sideplates together.

The top most aluminum tube (28) is covered with a rubber grip (71) and serves as the top handle. An electrical switch (36) is mounted next to this top handle on the right side plate. Also, tapped in the front top tube, is a brass nipple (37) for the attachment of the water hose (21). Holes (38) are bored through the other side of the tube as well as the cutterhead setup cover (27) allowing water, which runs through the tube and out the bored holes, to continuously flush the cutterhead when in operation.

A flat piece of aluminum (39), serving as the bottom handle, bisects the two most bottom aluminum tubes (30,31) holding the sideplates together and is held in place with the stainless steel threaded rods. This bottom handle is also covered with a rubber grip (72).

The two most front aluminum tubes (29,30) are placed so as to force the cutterhead setup cover onto the aluminum cheek plates.

The hydraulic motor (40) is mounted on the left sideplate and sits between the two sideplates. Its shaft (41) protrudes to the left of the left sideplate. Because the hydraulic motor has rear ports (73), the right hand sideplate is equiped with an opening (42) for the hydraulic hoses to exit.

A two an one quarter inch hydraulic motor shaft pulley (43) (outside parameter-steel and core-aluminum) sits on the shaft (41). A rubber transmission belt (44) connects this pulley to the shaft-cutterhead pulley (45). Both pulleys and the belt are housed under an aluminum cover (46) which is attached to the assembly with a machine screw (47) fastened into an aluminum stud (48) protruding from the sideplate.

The cutterhead shaft (49) runs through the ball bearings (26) in both side plates and a one inch pulley (45) sits on the left side of the shaft. Between the two cheek plates, moving from left to right, the shaft runs sequentially through a rollerguide (50), the cutterhead (51) and then another rollerguide (52). The shaft is held in place with two machine screws (53,54) (one quarter inch by twenty), one in each end of the shaft, along with a washer to fit. Two inches in the middle of the cutterhead shaft are machined into a flat surface (55). There is a groove (56) in the middle of the flat surface for two set screws (57,58) which fasten the cutterhead in place. The left side of the shaft has one inch keyway (59) cut into it in order to lock the smaller pulley in place.

The cutterhead (51) is made of tool-steel and is approximately two and three quarter inches long and two inches in diameter. Eight flukes (60) have been cut into it. They are approximately one half inch deep, angle foreward at six degrees and are slightly foreward of the center. Approximately twenty eight C4 carbide teeth (61) are soldered into these eight flukes. They are staggered and overlap so the cut surface may be completely flat. The cutterhead is fastened to the shaft via two set screws (57,58) as explained above. The shaft goes through the one half inch diameter hole (62) bored through the middle of the cutterhead.

Spaced away from the cutterhead on either side of it by (one half inch) stainless steel washers (63,64) are two rollerguides (50,52) which ensure the carbide teeth can only dig in by a chosen depth. These rollerguides are ball bearings (74,75) with aluminum rings press fitted onto them in order to extend their diameters. The right hand roller guide (52) duplicates the diameter of the cutterhead and provides for a flush cut. The left rollerguide (50) is slightly smaller than the cutterhead diameter and allows the cutterhead to dig its teeth into the material to be cut. Different cut depth can be chosen by inserting different diameter rollerguides on the left side of the cutterhead. The inside diameter of the rollerguides matches the outside diameter of the shaft (one half inch). The rollerguides may be locked into place (therefore not roll). The two side plates may accomodate two stainless steel brackets to serve as adjustable guides as an alternative to the rollerguides.

The cutterhead, rollerguides and washers may be exchanged by removing the machine screw and washer out of the right hand end of the shaft. The shaft, along with the pulley may now be pulled out. The reverse procedure reassembles the cutterhead setup with the option of a different cutterhead and/or rollerguide.

What is claimed is:

1. A machine for planing gelcoat, fiberglass and other materials comprising:

a planer unit for mounting a cutter head, said planer unit having a frame comprising two spaced side plates having ledge means connected by a half round cover and a plurality of tubes, a first one of said tubes being spaced from said cover to provide a first hand grip, a second hand grip connected to a second tube on said cover and extending generally transverse to the cover surface and to said first hand grip, a cutter head shaft mounted for rotation between said side plates, said shaft mounting an elongated multiple tooth cutter head for rotation therewith, and one roller guide rotatably mounted on said shaft at each side of the cutter head, one of said roller guides has an outer diameter equal to the diameter of the cutter head and the other roller guide has an outer diameter slightly smaller than the diameter of the cutter head, means providing said smaller roller guide to be removable from said cutter head and replaceable by another roller guide of different diameter whereby the depth of cut is adjustable at the discretion of the operator, a hydraulic motor having a drive shaft mounted to one of said side plates, belt means connected to a pulley on said motor drive shaft and a pulley on said cutter head shaft to thereby drive said cutter head shaft in rotation;

water supply means comprising another of said tubes on said cover extending between said side plates and having holes therein and in said cover to direct water to flush the cutter head, said another of said tubes and said cover supported on said ledge means, and a bottom power unit remote from said planer unit and connected thereto by flexible power transmission lines to power said hydraulic motor.

2. A machine according to claim 1 wherein said cutter head compromises a staggered tooth planer in which the teeth are set into fludes out into the cutter head.

3. A machine according to claim 1 wherein means are provided to make stationary said roller guides.

4. A machine according to claim 1 wherein said bottom power unit compromises a platform mounted on pneumatic wheels with handles attached to the back portion of the platform enabling the transmission lines to be coiled thereon and the unit to be pushed; said platform mounting a hydraulic fluid tank and a utility engine connected to drive a hydraulic pump.

* * * * *